(12) United States Patent
Kim et al.

(10) Patent No.: US 10,539,436 B2
(45) Date of Patent: Jan. 21, 2020

(54) PRESSURE SENSING APPARATUS FOR AIRBAG

(71) Applicants: Hyundai Mobis Co., Ltd., Seoul (KR); KOREA ELECTRIC TERMINAL CO., LTD., Incheon (KR)

(72) Inventors: Sang Do Kim, Yongin-si (KR); Hyun Seok Yun, Seoul (KR)

(73) Assignees: Hyundai Mobis Co., Ltd., Seoul (KR); KOREA ELECTRIC TERMINAL CO., LTD., Incheon (KR)

( * ) Notice: Subject to any disclaimer, the term of this patent is extended or adjusted under 35 U.S.C. 154(b) by 0 days.

(21) Appl. No.: 16/128,992

(22) Filed: Sep. 12, 2018

(65) Prior Publication Data
US 2019/0086245 A1 Mar. 21, 2019

(30) Foreign Application Priority Data

Sep. 15, 2017 (KR) .................. 10-2017-0118397

(51) Int. Cl.
| | |
|---|---|
| *G01D 11/24* | (2006.01) |
| *B60R 21/0136* | (2006.01) |
| *G01P 1/02* | (2006.01) |
| *B60R 21/01* | (2006.01) |

(52) U.S. Cl.
CPC ........ *G01D 11/245* (2013.01); *B60R 21/0136* (2013.01); *G01P 1/026* (2013.01); *B60R 2021/01006* (2013.01); *B60R 2021/01286* (2013.01)

(58) Field of Classification Search
CPC .............................. G01D 11/24; G01D 11/245
See application file for complete search history.

(56) References Cited

U.S. PATENT DOCUMENTS

| | | | | |
|---|---|---|---|---|
| 4,656,454 A | * | 4/1987 | Rosenberger | G01L 19/0084 29/621.1 |
| 9,360,348 B2 | * | 6/2016 | Henzler | G01D 11/245 |
| 2018/0246001 A1 | * | 8/2018 | Kim | G01L 19/144 |

* cited by examiner

*Primary Examiner* — Jamel E Williams
(74) *Attorney, Agent, or Firm* — H.C. Park & Associates, PLC

(57) ABSTRACT

A pressure sensing apparatus for an airbag may include: a sensor element configured to measure a change of air pressure by a vehicle collision; a housing having the sensor element seated therein, including a terminal part electrically connected to the sensor element, and fixed to a vehicle body; a cover detachably installed on the housing; and an elastic pressing part having one side connected to the cover and the other side protruded toward the sensor element so as to press the sensor element, and formed of an elastically deformable material. The housing may include a support protrusion to support the bottom of the sensor element with the terminal part.

9 Claims, 10 Drawing Sheets

PRESSURE SENSING APPARATUS FOR AIRBAG

CROSS-REFERENCES TO RELATED APPLICATION

This application claims priority from and the benefit of Korean Patent Application No. 10-2017-0118397, filed on Sep. 15, 2017, which is hereby incorporated by reference for all purposes as if set forth herein.

BACKGROUND

Field

Exemplary embodiments relate to a pressure sensing apparatus for an airbag, and more particularly, to a pressure sensing apparatus for an airbag, in which a sensor element can be stably mounted without a separate printed circuit board (PCB).

Discussion of the Background

In general, a vehicle includes a variety of safety devices for protecting a passenger in case of a collision accident. Representative examples of the safety devices may include an airbag device which is inflated by gas and protects a passenger using a cushion force.

The airbag device of the vehicle is operated in connection with a collision sensor. When an output signal of the collision sensor is inputted to an airbag control unit (ACU) in case of a vehicle collision, the airbag device is deployed by the ACU.

Recently, a pressure collision sensor is used to improve the deployment speed of an airbag in case of a vehicle collision. The pressure collision sensor is a pressure sensor which outputs a signal when a shockwave is transferred as shock-compressed air to the sensor body in case of a vehicle collision.

The pressure sensor mounted in a vehicle cannot measure air pressure at normal times, but measures a change of the air pressure only when the air pressure is changed in case of a vehicle collision.

The pressure sensor is connected to a PCB. The PCB is fixed in a housing installed in a shape to cover the pressure sensor. In order to fix the PCB in the housing, a separate structure needs to be additionally installed, and an assembling process for fixing the PCB is additionally performed. That is, the PCB may be fixed to the inside of the housing through a soldering or pressing process, or fixed to the inside of the housing through a separate bolting or bonding operation.

In the related art, when a sensor element is installed as the pressure sensor for measuring air pressure, the PCB connected to the sensor element needs to be additionally installed. Thus, the number of assembling processes is inevitably increased. Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the present invention are directed to a pressure sensing apparatus for an airbag, in which a sensor element can be stably mounted without a separate printed circuit board (PCB).

In one embodiment, a pressure sensing apparatus for an airbag may include: a sensor element configured to measure a change of air pressure by a vehicle collision; a housing having the sensor element seated therein, including a terminal part electrically connected to the sensor element, and fixed to a vehicle body; a cover detachably installed on the housing; and an elastic pressing part having one side connected to the cover and the other side protruded toward the sensor element so as to press the sensor element, and formed of an elastically deformable material. The housing may include a support protrusion to support the bottom of the sensor element with the terminal part.

The support protrusion may be brought in surface contact with the bottom of the sensor element.

The housing may include: a housing body having a mounting groove in which the sensor element is seated; and a connector extended from the housing body, and having a connector terminal formed therein, the connector terminal being connected to the terminal part. The support protrusion may protrude from the base surface of the housing body toward the sensor element and supports one side of the sensor element, and the terminal part may support the other side of the sensor element.

The housing may further include a sealing protrusion which protrudes from the housing body positioned at the edge of the entrance of the mounting groove and presses the elastic pressing part.

The housing body may further include a guide rib which protrudes to the inside of the mounting groove and guides the sensor element contacted with the terminal part.

The housing body may further include a guide groove to which a hook member formed on the cover is inserted and hooked. The guide groove may include: a first guide groove for guiding the hook member to move straight, the hook member being inserted into the housing body; and a second guide groove having an inclined guide surface along which the hook member moved through the first guide groove is moved toward the elastic pressing part and then hooked to the inside of the housing.

The cover may include: a cover body connected to the elastic pressing part; a hook member extended from the cover body, and inserted and coupled to the housing; and a protruding pipe protruding to the outside of the cover body, and forming a passage through which air is moved. Air pressure transferred through the protruding pipe may be transferred to the sensor element through a hole of the cover body and a hole of the elastic pressing part.

The hook member may include: a hook body extended from the cover body into the housing; and a hook protrusion protruding laterally from an end of the hook body, and hooked to the inside of the housing, and a contact surface of the housing, facing the hook protrusion, and an engagement surface of the hook protrusion, contacted with the contact surface, may be inclined.

The elastic pressing part may include: a plate-shaped internal elastic part pressed against a sealing protrusion formed on the housing; and an elastic pressing body protruding from the internal elastic part so as to press the sensor element, and forming an inner space connected to the protruding pipe.

The elastic pressing part may further include an anti-movement protrusion protruding to the inside of the housing from the elastic pressing body.

The elastic pressing body may include: a first body protruding toward the sensor element from the internal elastic part; and a second body having a height difference from the first body in a direction extending from the cover body away from the sensor element, and protruding toward the sensor element so as to press the sensor element. The pressing surface of the second body, facing the sensor element, may have an area equal to or smaller than the area of the sensor element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
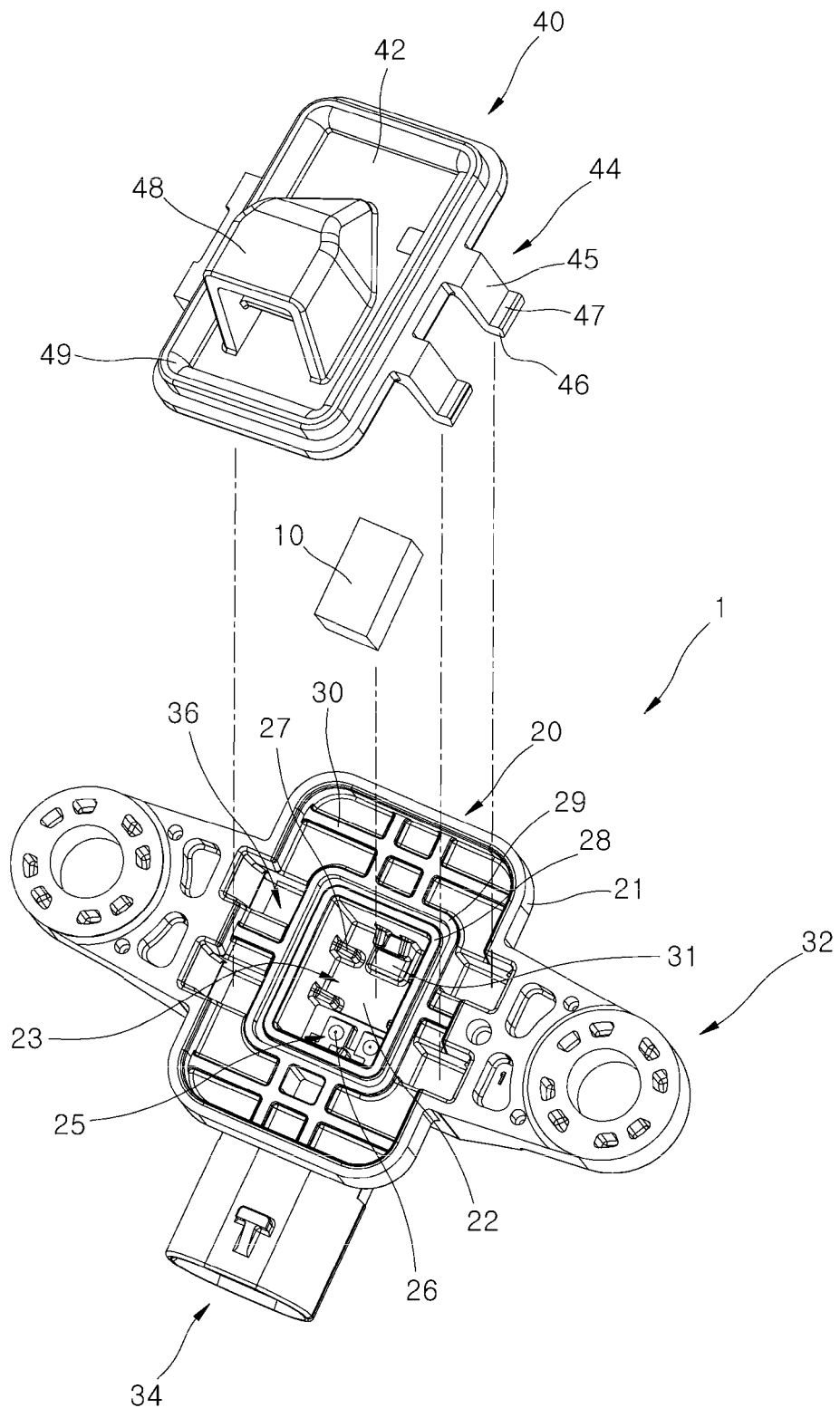
FIG. 1 is an exploded perspective view schematically illustrating the structure of a pressure sensing apparatus for an airbag in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
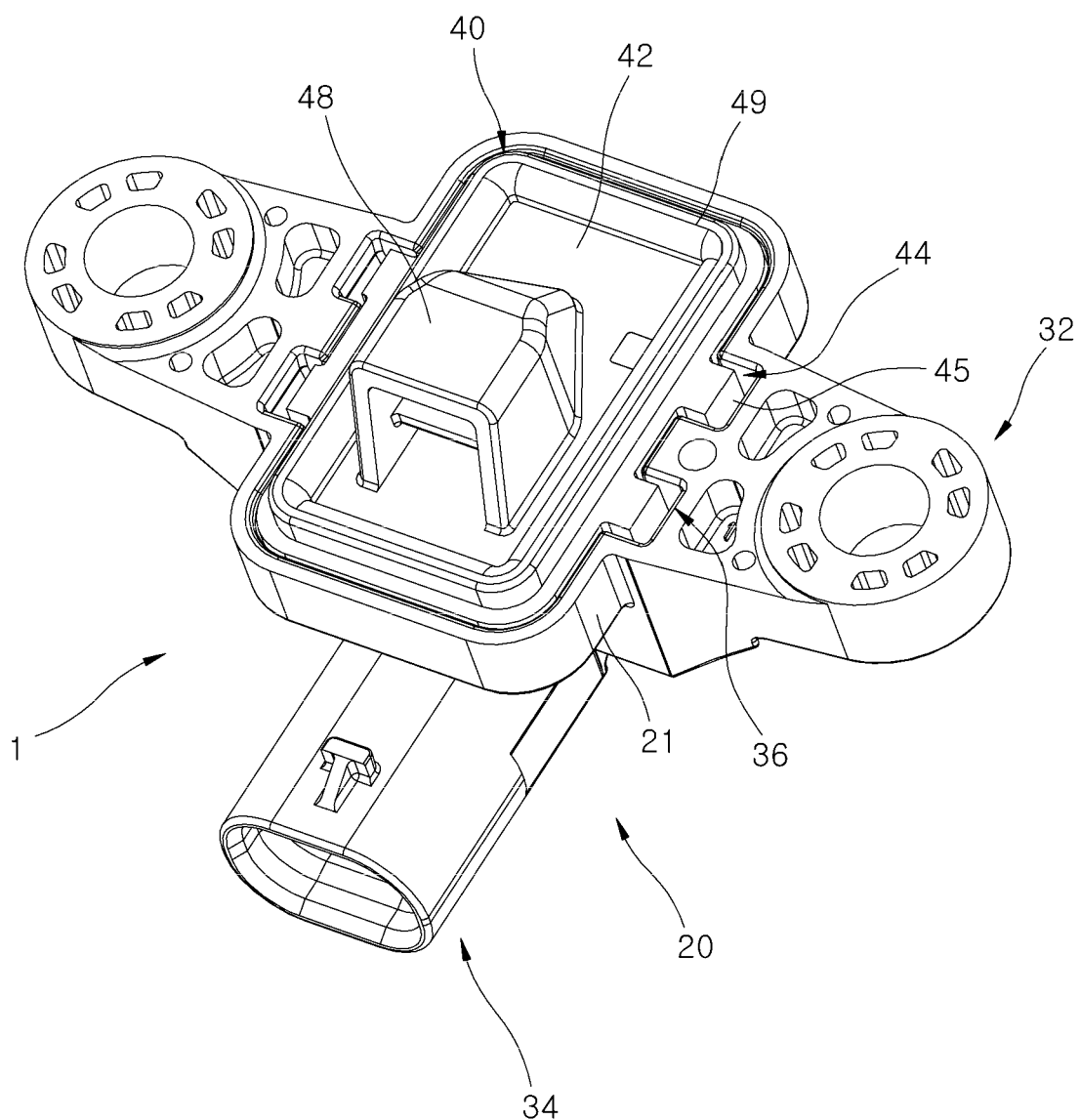
FIG. 2 is a perspective view illustrating the exterior of the pressure sensing apparatus for an airbag in accordance with the embodiment of the present invention.
Figure 3:
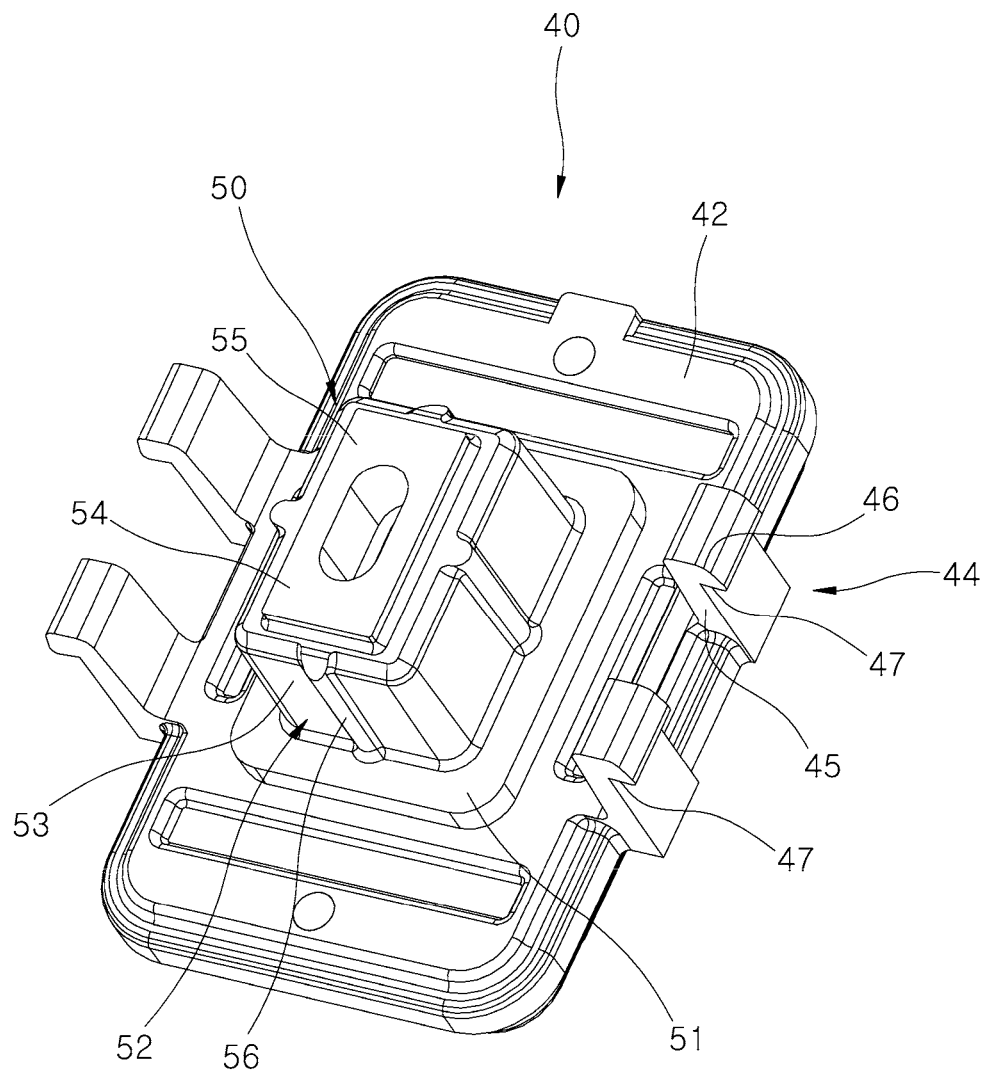
FIG. 3 is perspective view illustrating that an elastic pressing part is installed on a cover in accordance with the embodiment of the present invention.
Figure 4:
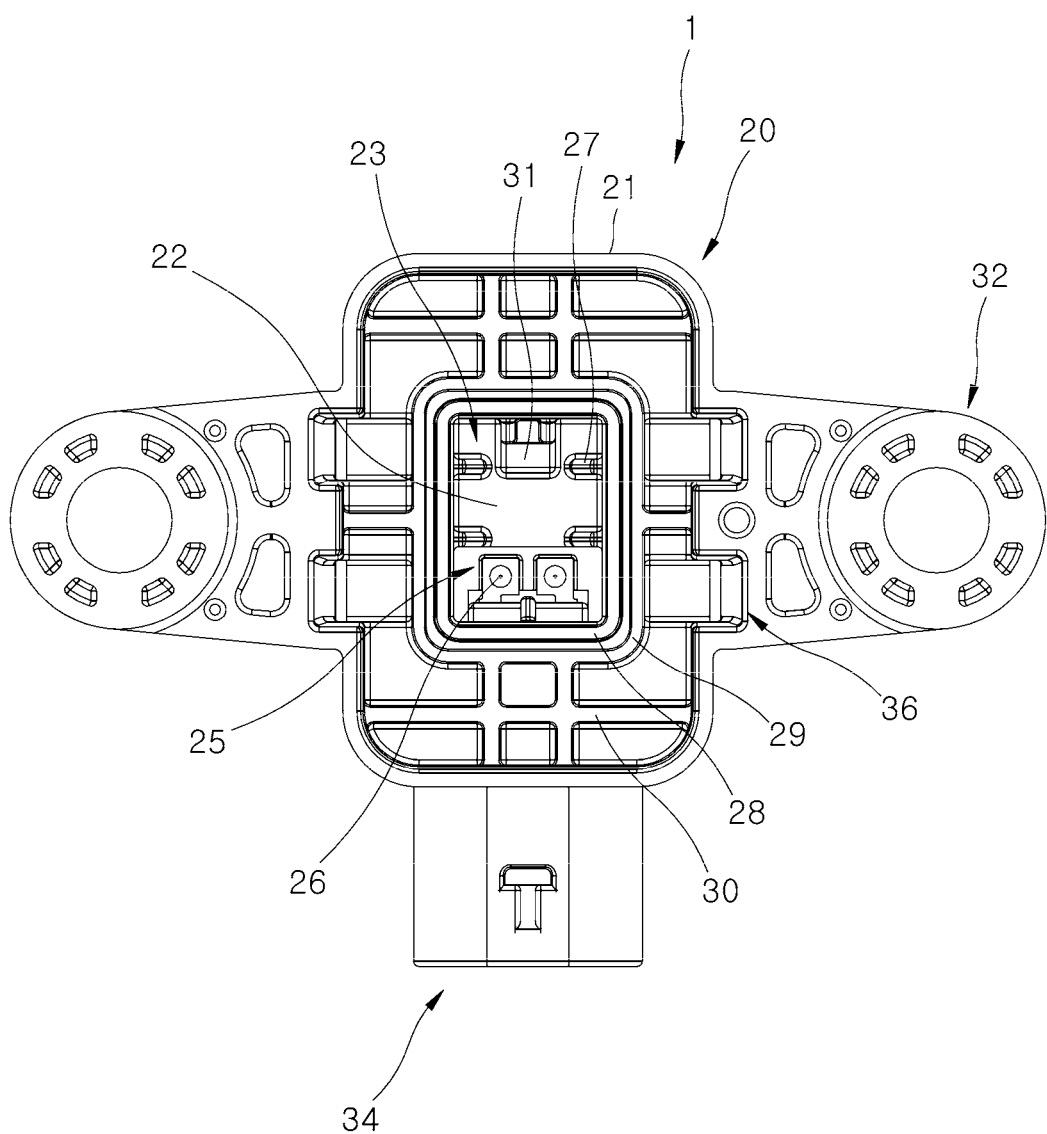
FIG. 4 is a plan view illustrating a housing in accordance with the embodiment of the present invention.
Figure 5:
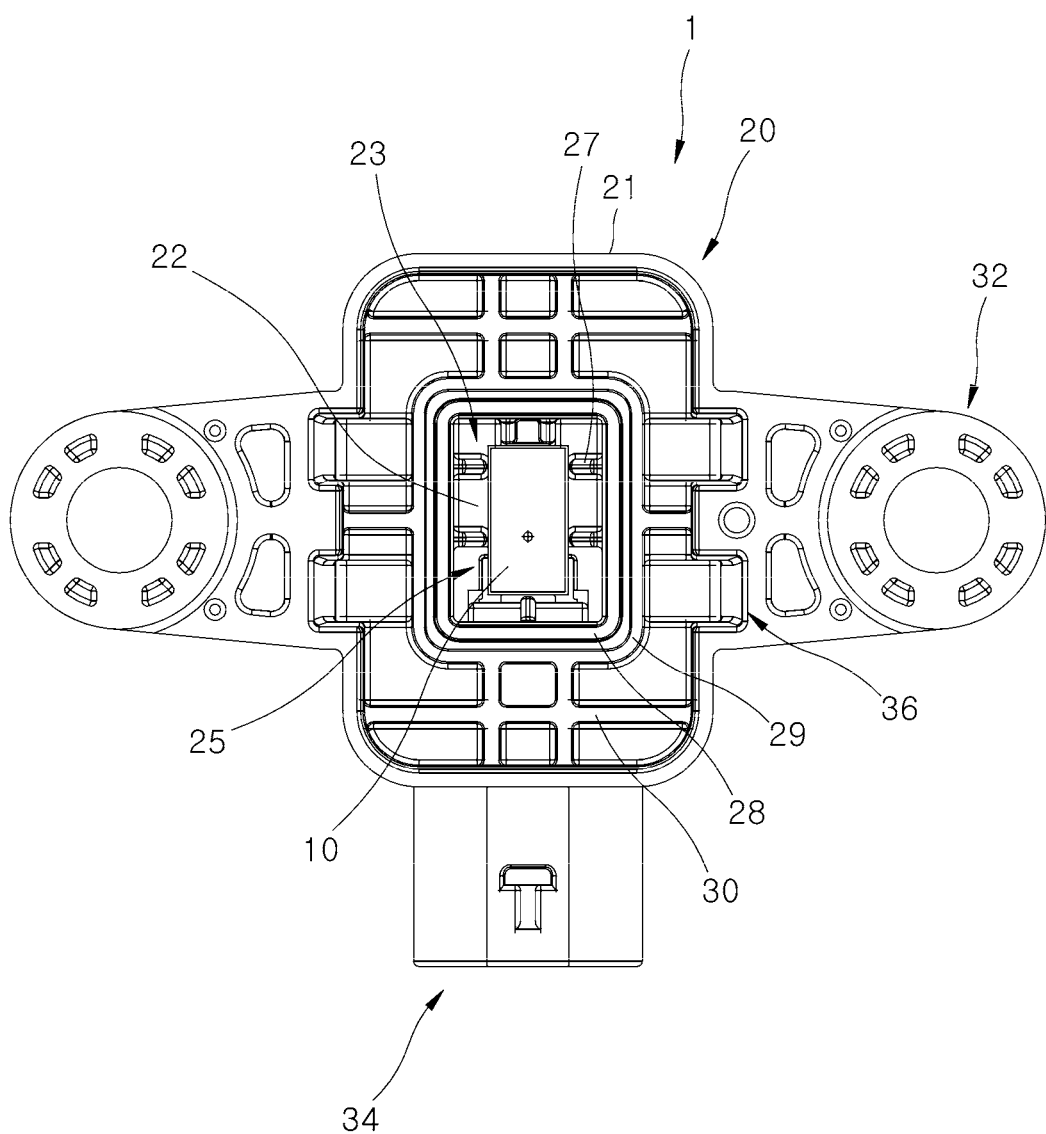
FIG. 5 is a plan view illustrating that a sensor element is mounted in the housing in accordance with the embodiment of the present invention.
Figure 6:
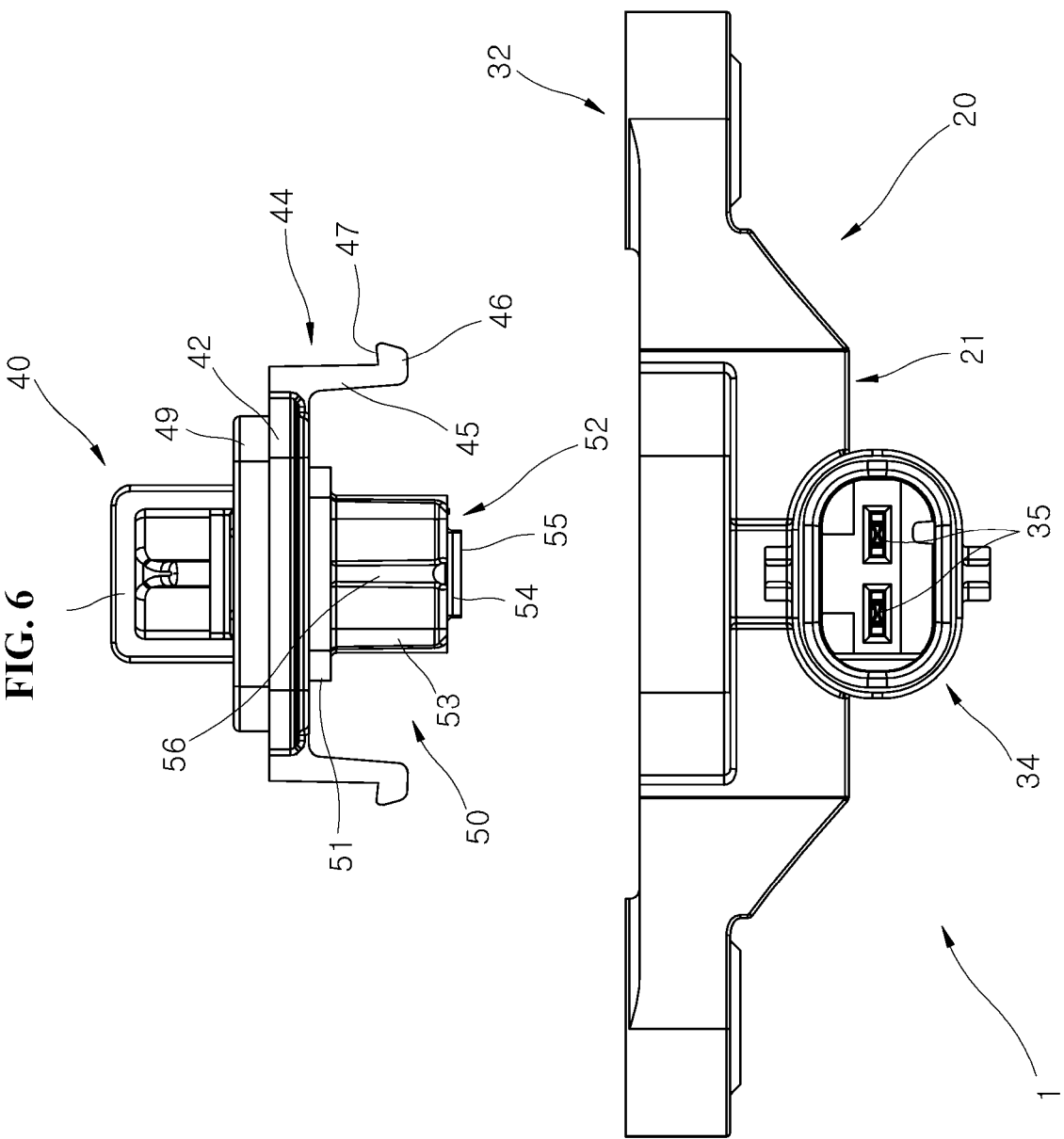
FIG. 6 illustrates a state before the cover is coupled to the housing in accordance with the embodiment of the present invention.
Figure 7:
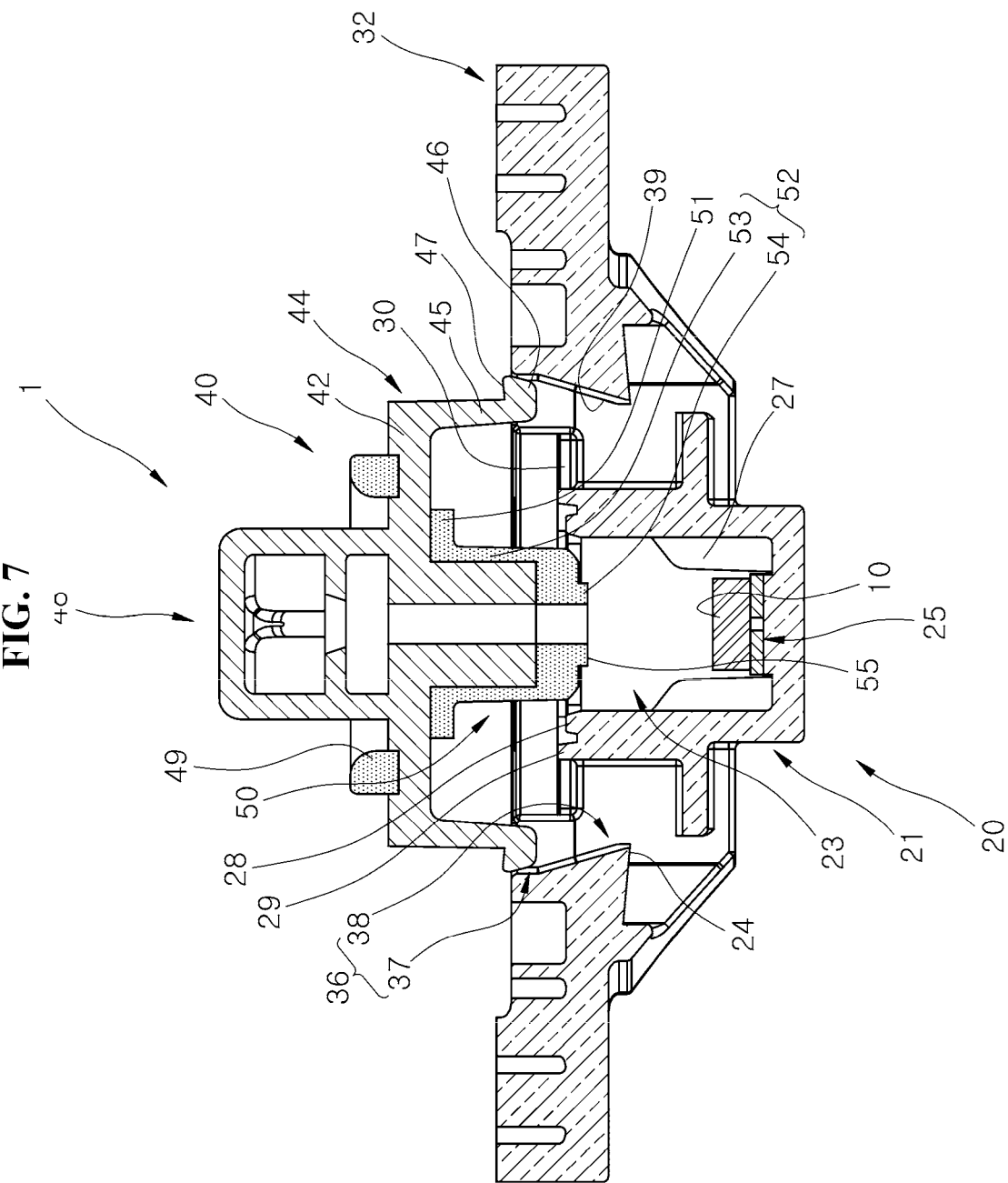
FIG. 7 illustrates that the cover is temporarily assembled to the housing in accordance with the embodiment of the present invention.
Figure 8:
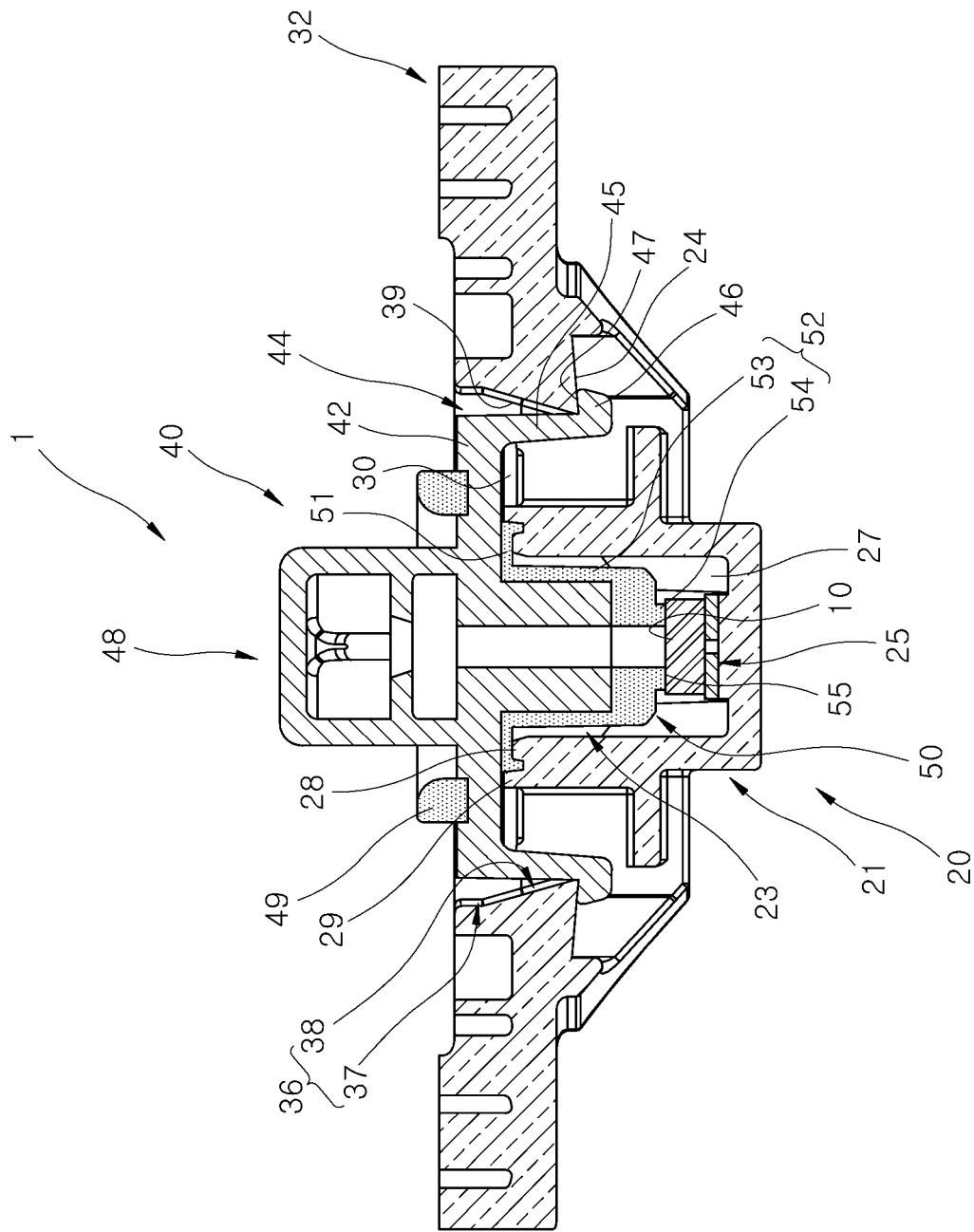
FIG. 8 illustrates that the cover is coupled to the housing in accordance with the embodiment of the present invention.
Figure 9:
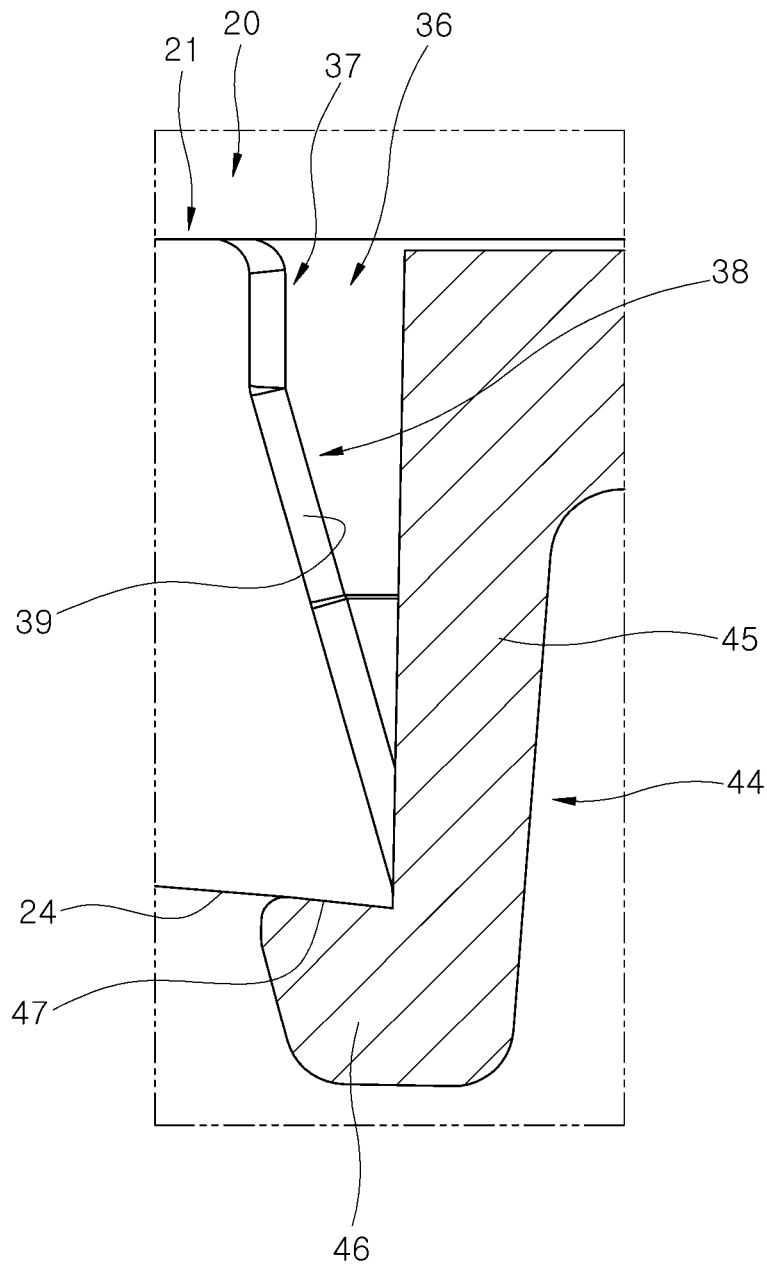
FIG. 9 illustrates that an engagement surface of a hook member and a contact surface of a housing body are inclined in accordance with the embodiment of the present invention.
Figure 10:
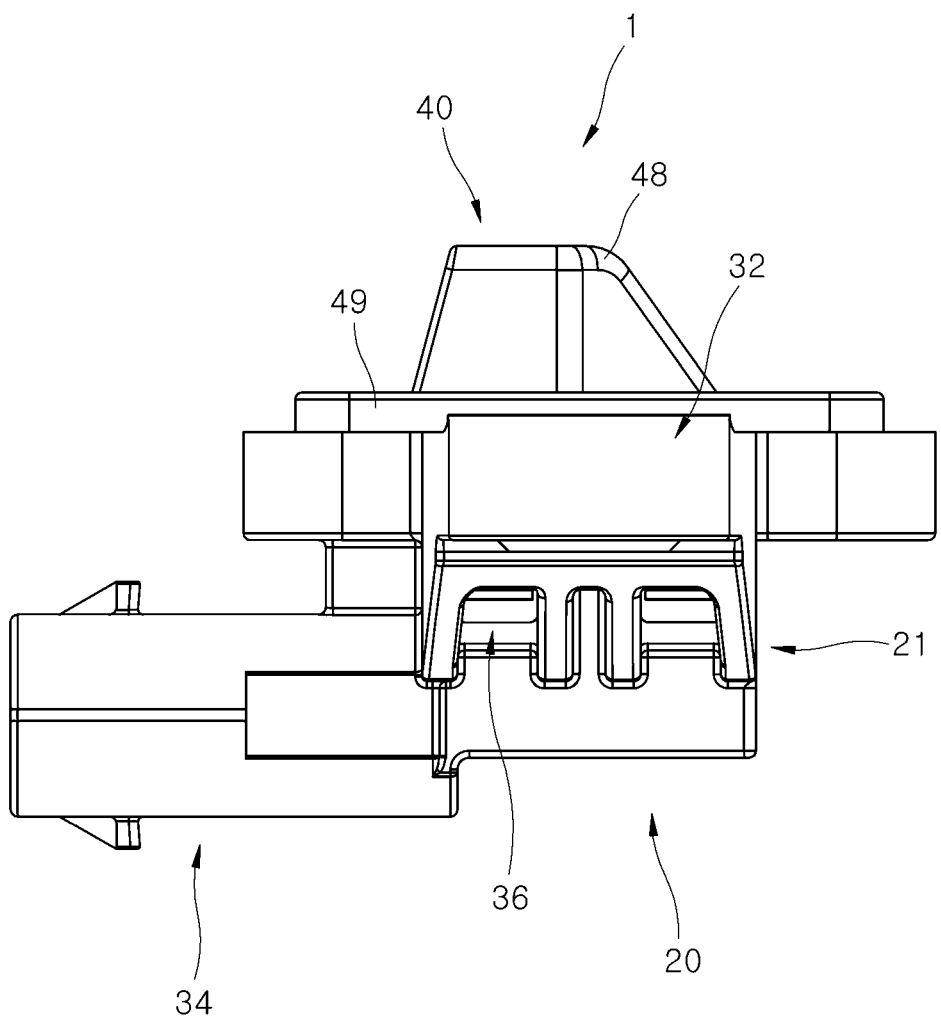
FIG. 10 is a side view illustrating the pressure sensing apparatus for an airbag in accordance with the embodiment of the present invention.

FIG. 1 is an exploded perspective view schematically illustrating the structure of a pressure sensing apparatus for an airbag in accordance with an embodiment of the present invention, FIG. 2 is a perspective view illustrating the exterior of the pressure sensing apparatus for an airbag in accordance with the embodiment of the present invention, FIG. 3 is perspective view illustrating that an elastic pressing part is installed on a cover in accordance with the embodiment of the present invention, FIG. 4 is a plan view illustrating a housing in accordance with the embodiment of the present invention, FIG. 5 is a plan view illustrating that a sensor element is mounted in the housing in accordance with the embodiment of the present invention, FIG. 6 illustrates a state before the cover is coupled to the housing in accordance with the embodiment of the present invention, FIG. 7 illustrates that the cover is temporarily assembled to the housing in accordance with the embodiment of the present invention, FIG. 8 illustrates that the cover is coupled to the housing in accordance with the embodiment of the present invention, FIG. 9 illustrates that an engagement surface of a hook member and a contact surface of a housing body are inclined in accordance with the embodiment of the present invention, and FIG. 10 is a side view illustrating the pressure sensing apparatus for an airbag in accordance with the embodiment of the present invention.

As illustrated in FIGS. 1 to 10, the pressure sensing apparatus 1 for an airbag in accordance with the embodiment of the present invention may include a sensor element 10, a housing 20, a cover 40 and an elastic pressing part 50.

The pressure sensing apparatus 1 for an airbag in accordance with the embodiment of the present invention may have a structure that presses the sensor element 10 against a terminal part 25. Through the structure that presses and fixes the sensor element 10 to the terminal part 25 of the housing 20, the sensor element 10 can be mounted in the housing 20 without a separate assembling part such as a PCB. Thus, the assembling structure of the sensor element 10 can be simplified.

The sensor element 10 is a pressure sensor to measure a change of air pressure by a vehicle collision. The sensor element 10 may have two or more electrical contacts, and come in contact with the terminal part 25 installed in the housing 20. The sensor element 10 may be formed in a rectangular parallelepiped shape, and inserted into a mounting groove 23 of the housing body 21, such that one side of the bottom of the sensor element 10 is brought in contact with the terminal part 25, and the other side of the bottom of the sensor element 10 is brought in contact with a support protrusion 31.

As illustrated in FIGS. 1, 2 and 4, the housing 20 may be formed in various shapes, as long as the housing 20 includes the sensor element 10 seated therein, has the terminal part 25 electrically connected to the sensor element 10 and the support protrusion 31 for supporting the sensor element 10, and is fixed to the vehicle body. The housing 20 in accordance with the embodiment of the present invention may include a housing body 21, the support protrusion 31, the terminal part 25, a stopper 30, a vehicle body mounting part 32 and a connector 34.

The pressure sensing apparatus 1 for an airbag may use the housing 20 in which the vehicle body mounting part 32 and the connector 34 are integrated with each other. Thus, when the cover 40 is mounted on the vehicle body after being assembled to the housing 20, external vibration caused by a wire connected to the connector 34 or the like may hardly influence the cover 40 and the sensor element 10 or can be minimized.

The housing body 21 can be modified in various shapes, as long as the housing body 21 includes the mounting groove 23 in which the sensor element 10 is seated. The vehicle body mounting part 32 may be connected to both sides of the housing body 21, and the connector 34 may be connected to the center bottom of the housing body 21. The housing body 21 in accordance with an embodiment may include the mounting groove 23, a guide rib 27, a sealing protrusion 28, an outer protrusion 29 and a guide groove 36.

The mounting groove 23 may serve as a groove for inserting the sensor element 10 into the housing body 21. The mounting groove 23 in accordance with an embodiment may be extended in the top-to-bottom direction, and the sealing protrusion 28 protruding upward along the edge of the mounting groove 23 may be brought in contact with an internal elastic part 51 fixed to the bottom of the cover 40. Therefore, since the internal elastic part 51 is pressed in a concave shape against the sealing protrusion 28, the internal elastic part 51 may have a sealing function of preventing a fluid flow.

As illustrated in FIGS. 1, 4, 5 and 9, the guide rib 27 for guiding the sensor element 10 may be formed in the mounting groove 23. The guide rib 27 may be formed in various shapes, as long as the guide rib 27 protrudes to the inside of the mounting groove 23 and guides the sensor element 10 contacted with the terminal part 25 in the top-to-bottom direction. The guide rib 27 in accordance with an embodiment may include a plurality of protrusions which are protruded to the inside of the mounting groove 23 and extended in the top-to-bottom direction. The guide ribs 27 may be brought in contact with a side surface of the sensor element 10 supported by the terminal part 25 and the support protrusion 31, or spaced at preset intervals so as to guide the sensor element 10 in the top-to-bottom direction. Furthermore, the guide rib 27 may prevent horizontal vibration of the sensor element 10 contacted with the terminal part 25, and guide the sensor element 10 such that the sensor element 10 can be stably mounted.

The sealing protrusion 28 may be formed in various shapes, as long as the sealing protrusion 28 protrudes from the housing body 21 positioned around the entrance of the mounting groove 23 and presses the internal elastic part 51 of the elastic pressing part 50. Since the sealing protrusion 28 at the edge of the mounting groove 23 protrudes upward to pressurize the elastic pressing part 50, the internal elastic part 51 of the elastic pressing part 50 may be pressed against the sealing protrusion 28, and concavely deformed to perform a sealing function.

An outer protrusion 29 may be positioned outside the sealing protrusion 28, and protrude upward from the housing body 21 with the sealing protrusion 28. Since the outer protrusion 29 is positioned outside the sealing protrusion 28 so as to be separated from the sealing protrusion 28, the internal elastic part of the elastic pressing part 50 may be positioned inside the outer protrusion 29.

The guide groove 36 may be formed in the housing body 21, and serve as a groove into which a hook member 44 formed on the cover 40 is inserted and caught. The guide groove 36, into which the snap fit-type hook member 44 is introduced when the cover 40 is assembled, may have a guide shape for stably assembling the cover 40. The guide groove 36 in accordance with an embodiment may include first and second guide grooves 37 and 38.

The first guide groove 37 may have a groove shape to guide the hook member 44 to move straight while the hook member 44 is inserted into the housing body 21. The number of first guide grooves 37 may be proportional to the number of hook members 44, and the first guide grooves 37 extended in the top-to-bottom direction may be formed at both sides of the mounting groove 23.

The second guide groove 38 may have an inclined guide surface 39 along which the hook member 44 moved downward through the first guide groove 37 is moved toward the elastic pressing part 50 and then hooked to the inside of the housing 20. The inclined guide surface 39 is inclined toward the mounting groove 23 from top to bottom, the mounting groove 23 corresponding to the center of the housing body 21. Therefore, the end portions of the hook members 44 moved along the second guide grooves 38 may be moved downward while being gradually focused toward the elastic pressing part 50.

The bottom of the inclined guide surface 39 may be connected to the contact surface 24 formed in the housing 20. The contact surface 24 of the housing body 21, to which the hook protrusion 46 of the hook member 44 is hooked, may be extended laterally from the bottom of the second guide groove 38. Therefore, the hook members 44 which are elastically deformed while moved downward along the second guide grooves 38 may be moved to the bottoms of the second guide grooves 38, moved toward both sides of the elastic pressing part 50 by their elastic restoring force, and hooked to the inside of the housing 20.

In order to raise the coupling force of the hook member 44, an engagement surface 47 of the hook protrusion 46, which is hooked to the inside of the housing body 21, and the contact surface of the housing body 21, which is contacted with the engagement surface 47, may be inclined to improve the coupling force of the hook member 44. That is, the engagement surface 47 formed at the top of the hook protrusion 46 may be inclined upward toward the end thereof. The contact surface 24 of the housing body 21, which is contacted with the engagement surface 47, may also be inclined downward in a shape corresponding to the engagement surface 47. Therefore, since the engagement surface 47 formed on the hook protrusion 46 of the hook member 44 and the contact surface 24 of the housing body 21 are inclined so as to come in contact with each other, the coupling force by which the hook protrusion 46 is hooked to the housing body 21 can be raised.

The support protrusion 31 may protrude upward from a base surface 22 forming the bottom surface of the mounting groove 23, and support the bottom of the sensor element 10 with the terminal part 25. One side of the sensor element 10 may be brought in surface contact with the support protrusion 31 of the housing 20, and the other side of the sensor element 10 may be mounted on the terminal part 25 so as to form an electrical contact with the terminal part 25. That is, since the support protrusion 31 protrudes from the base surface 22 of the housing body 21 toward the sensor element 10 so as to support the one side of the sensor element 10 and the terminal part 25 supports the other side of the sensor element 10, the sensor element 10 may be horizontally installed.

The terminal part 25 positioned at the bottom of the mounting groove 23 may be formed of a conductor. The terminal part 25 may include a round terminal 26 protruding in a hemispherical shape toward the sensor element 10, and protrude to the inside of the mounting groove 23. Since the sensor element 10 is contacted with the round terminal 26 of the terminal part 25, an electrical contact may be achieved.

As illustrated in FIGS. 1 and 9, the stopper 30 may have a protrusion shape which is protrudes from the housing body 21 facing the cover 40 so as to support the cover 40. The stopper 30 in accordance with an embodiment may include a grid-shaped protrusion formed on the top surface of the housing body 21 facing the cover 40. Since the stopper 30 supports the bottom of the cover 40 when the cover 40 is assembled into the housing 20, the sensor element 10 can be prevented from being excessively pressed by the elastic pressing part 50.

The vehicle body mounting part 32 may be protruded from both sides of the housing body 21 and fixed to the vehicle body. The vehicle body mounting part 32 in accordance with an embodiment may have a hole through which the vehicle body mounting part 32 is fixed to the vehicle body.

As illustrated in FIGS. 1 and 8, the connector 34 may be extended from the housing body 21, and have a connector terminal 35 installed therein, the connector terminal 35 being connected to the terminal part 25. The housing body 21, the vehicle body mounting part 32 and the connector 34 may be injection-molded as one body.

As illustrated in FIGS. 2, 3 and 6 to 9, the cover 40 may be formed in various shapes, as long as the cover 40 is detachably installed on the housing 20. The cover 40 in accordance with an invention may include a cover body 42, the hook member 44, a protruding pipe 48 and an external elastic part 49.

The cover body 42 connected to the elastic pressing part 50 may be formed in a plate shape. The elastic pressing part 50 may be installed at one side of the cover body 42, facing the mounting groove 23, and the external elastic part 49 and the protruding pipe 48 may be installed at the other side of the cover body 42. The hook member 44 may be connected to both sides of the cover body 42. The hook member 44 moved with the cover body 42 may be inserted into the housing body 21 through the guide groove 36, and hooked to the contact surface 24. The cover body 42 may be fixed to the stopper 30 while blocking the opened entrance of the mounting groove 23.

The hook member 44 may be extended from the cover body 42, and fitted and coupled to the housing 20. The plurality of hook members 44 protruding from the edge of the cover body 42 toward the housing 20 may be inserted into the guide grooves 36 formed in the housing 20, and fitted and coupled to the housing 20. The hook member 44 in accordance with an embodiment may include a hook body 45 and a hook protrusion 46.

The hook body 45 may have a rod shape extended to the inside of the housing 20 from the cover body 42, and the hook protrusion 46 may have a protrusion shape which is protruded laterally from the end of the hook body 45 and hooked to the inside of the housing 20. When the cover 40 is coupled to the housing 20, the elastic pressing part 50 moved with the cover 40 may be deformed while pressed against the housing 20 and the sensor element 10, and thus generate a repulsive force. Using the repulsive force of the elastic pressing part 50, an operator can rapidly perform an operation of assembling the housing 20 and the cover 40 through the snap fit-type hook member 44 in order to prevent a separation of the cover 40 from the housing 20. Since the contact surface 24 of the housing 20 facing the hook protrusion 46 and the engagement surface 47 of the hook protrusion 46, which is contacted with the contact surface 24, are inclined, it is possible to prevent a separation of the hook protrusion 46 from the housing 20 by an external shock or the like.

Since the hook protrusion 46 of the hook member 44 is positioned in the housing 20 after the cover 40 is assembled, it is possible to prevent a situation in which the hook protrusion 46 is damaged by a member installed outside the housing body 21 or separated from the housing body 21.

The protruding pipe 48 may be protruded to the outside of the cover body 42 so as to form a passage through which air is moved, and formed in a pipe shape. The protruding pipe 48 in accordance with an embodiment may be protruded to the outside of the cover body 42, such that only one side thereof is opened and the top side and other sides thereof are closed. The protruding pipe 48 may have a triangle cross-section, and only one side of the protruding pipe 48 may be opened to form a passage through which outside air pressure is transferred.

The cover body 42 connected to the protruding pipe 48 may have a hole to communicate with the inside of the protruding pipe 48, and the hole formed in the cover body 42 may be connected to the inner space of the elastic pressing part 50.

The air pressure transferred through the protruding pipe 48 may be transferred to the sensor element 10 through the hole of the cover body 42 and the hole of the elastic pressing part 50.

The cover 40 may be formed through double-shot injection molding with the elastic pressing part 50 and the external elastic part 49 which are elastic bodies. The elastic body used as the material of the elastic pressing part 50 and the external elastic part 49 may include thermoplastic elastomer or rubber.

When the pressure sensing apparatus 1 for an airbag is mounted in the vehicle body as illustrated in FIGS. 1 and 2, the external elastic part 49 can be pressed against the vehicle body, and thus perform a sealing function. The external elastic part 49 in accordance with an embodiment may include an elastic body which forms a band outside the protruding pipe 48, and is fixed to the outside of the cover body 42. The external elastic part 49 is an elastic protrusion formed in a rectangular frame shape, and is fixed to the outside of the cover body 42. Therefore, when the housing 20 is fixed to the vehicle body and the cover 40 with the external elastic part 49 is fixed to the housing 20, the external elastic part 49 may perform a sealing function while another portion of the vehicle body is pressed against the external elastic part 49.

As illustrated in FIGS. 3 and 6 to 8, the elastic pressing part 50 may have one side connected to the cover 40 and the other side protruded toward the sensor element 10, and may be formed of a material which is elastically deformed while pressing the sensor element 10. The elastic pressing part 50 may have a pressing surface 55 facing the sensor element 10, and the pressing surface 55 may have an area equal to or smaller than the area of the sensor element 10 facing the pressing surface 55. Since the pressing surface 55 of the elastic pressing part 50 is equal to or smaller than the outer size of the sensor element 10, the sensor element 10 may not be excessively pressed to one side, but pressed by a uniform force. Therefore, since the sensor element 10 is stably connected to the round terminal 26 of the terminal part 25, the operation reliability of the pressure sensing apparatus 1 for an airbag can be improved.

When the cover 40 is coupled to the housing 20, the elastic pressing part 50 connected to the cover 40 may be pressed against the sensor element 10 and thus secure an electrical contact between the sensor element 10 and the terminal part 25 having a semispherical protrusion structure.

The elastic pressing part 50 in accordance with an embodiment may be formed of an elastic body, and include the internal elastic part 51, an elastic pressing body 52, and an anti-movement protrusion 56.

The internal elastic part 51 may include a plate-shaped elastic body pressed against the sealing protrusion 28. The internal elastic part 51 may be fixed to one surface of the cover 40. When the cover 40 is coupled to the housing 20, the internal elastic part 51 may perform a sealing function while pressed against the sealing protrusion 28 disposed in the housing 20 and formed in a rectangular frame shape. The internal elastic part 51 in accordance with an embodiment may include an elastic body which is formed in a plate shape at the top of the elastic pressing part 50 and inserted into the outer protrusion 29.

In order to form the sealing structure between the housing 20 and the cover 40, the internal elastic part 51 may be overlapped and pressed by the sealing protrusion 28 of the housing 20.

The elastic pressing body 52 may include an elastic body which protrudes from the internal elastic part 51 so as to press the sensor element 10, and forms an internal space connected to the protruding pipe 48. The elastic pressing body 52 in accordance with an embodiment may be installed in a shape to protrude downward from the cover body 42, and have an empty space formed therein. The hole of the cover body 42 and the internal space of the elastic pressing part 50 may communicate with each other, and the pressing surface 55 of the elastic pressing part 50, facing the sensor element 10, may have a hole. Therefore, the air pressure transferred through the protruding pipe 48 may be transferred into the elastic pressing part 50 through the hole formed in the cover body 42, and then transferred to the sensor element 10 through the connection hole formed in the elastic pressing part 50. That is, the elastic pressing part 50 may have a hole for transferring pressure from outside to the sensor element 10, and the shape or length of the elastic pressing part 50 may be deformed or changed by an external force.

The elastic pressing body 52 may have a multi-stage structure. Through a stepped structure, the elastic pressing body 52 inserted into the housing 20 can suppress pushing and deformation and maintain a stable contact, when overlapping the sensor element 10. In order to reliably form an electrical contact between the sensor element 10 and the terminal part 25, the sensor element 10 may be overlapped and pressed by the elastic pressing body 52 and then assembled. The elastic pressing body 52 in accordance with an embodiment may include first and second bodies 53 and 54.

The first body 53 may be protruded downward from the internal elastic part 51 toward the sensor element 10. The second body 54 may be protruded toward the sensor element 10 so as to press the sensor element 10, while having a height difference from the first body 53 in a direction extending from the cover body away from the sensor element. The second body 54 may have a smaller cross-sectional area than the first body 53. Since the pressing surface 55 of the second body 54, facing the sensor element 10, has an area equal to or smaller than the area of the sensor element 10, the top of the sensor element 10 can be uniformly pressed.

The anti-movement protrusion 56 may be formed in a shape to protrude toward the inside of the housing 20 from the elastic pressing body 52. The anti-movement protrusion 56 may be protruded in a lateral direction of the elastic pressing body 52, and extended in the top-to-bottom direction of the elastic pressing body 52. The anti-movement protrusion 56 may be formed outside the first body 53 having a rectangular parallelepiped shape. In the present embodiment, a plurality of anti-movement protrusions 56 may be formed on the respective surfaces of the first body 53. Therefore, when a movement is caused by vibration, the anti-movement protrusions 56 formed on the respective surfaces of the first body 53 may be pressed against the inner wall surface of the housing 20, thereby suppressing the movement of the elastic pressing part 50 and the cover 40. That is, the anti-movement protrusions 56 may be installed on the respective side surfaces of the elastic pressing part 50 inserted into the housing 20, thereby suppressing movement in the housing 20 by vibration.

Hereafter, the operation of the pressure sensing apparatus 1 for an airbag in accordance with the embodiment of the present invention will be described in detail with reference to the accompanying drawings.

The sensor element 10 may be guided along the guide rib 27 and seated in the mounting groove 23. At this time, since one side of the sensor element 10 comes in surface contact with the support protrusion 31, the sensor element 10 may be stably contacted with the terminal part 25 while horizontally maintained. Thus, the other side of the sensor element 10 may be electrically connected to the round terminal 26 of the terminal part 25.

Since the hook member 44 of the cover 40 is moved along the guide groove 36 of the housing 20 and then hooked to the inside of the housing 20, the cover 40 may block the opened portion of the mounting groove 23. That is, the hook protrusion 46 of the hook member 44 may be hooked to the first guide groove 37 of the guide groove 36, such that the cover 40 can be temporarily assembled to the outside of the housing 20.

When the cover 40 is additionally moved toward the housing 20, the hook protrusions 46 may be elastically deformed while focused toward the elastic pressing part 50 along the inclined guide surfaces 39 of the second guide grooves 38. The hook protrusion 46 moved to the bottom of the second guide groove 38 may be spread by its elastic force, and hooked and fixed to the contact surface 24 formed at the bottom of the second guide groove 38. At this time, since the contact surface 24 and the engagement surface 47 of the hook protrusion 46 are inclined downward toward the center of the housing body 21 having the mounting groove 23 formed therein, the operation of focusing the hook protrusions 46 toward the elastic pressing part 50 may not be easily performed. Therefore, the coupling force of the hook member 44 can be improved.

The elastic pressing part 50 connected to the cover body 42 may press the sensor element 10 in such a direction that the sensor element 10 is brought in contact with the terminal part 25. Since the internal elastic part 51 brought in contact with the housing 20 and the cover 40 is pressed against the sealing protrusion 28 of the housing 20, the internal elastic part 51 may perform a sealing function. Therefore, the air outside the housing 20 can be blocked from flowing into the sensor element 10 through the internal elastic part 51, which makes it possible to increase the precision of the sensor element 10.

The cover 40 and the elastic pressing part 50 may press the sensor element 10 such that the electrical contact between the sensor element 10 and the terminal part 25 is achieved at all times, which makes it possible to prevent a separation of the sensor element 10 from the terminal part 25 by external vibration or the like.

Since the pressing surface 55 of the elastic pressing part 50 which presses the sensor element 10 has an area equal to or smaller than the area of the top surface of the sensor element 10 facing the elastic pressing part 50, an excessive force may not be transferred to one side of the sensor element 10.

The cover body 42 may be blocked from moving by a preset value or more, while coming in contact with the protrusion-shaped stopper 30 protruding from the housing body 21. Thus, the elastic pressing part 50 moved with the cover body 42 can be prevented from excessively pressing the sensor element 10. Furthermore, since the external elastic part 49 is pressed against the vehicle body when mounted on the vehicle body, the external elastic part 49 may perform a sealing function.

When a shockwave is generated as a change of air pressure by a vehicle accident, the shockwave may be moved through the protruding pipe 48, and transferred to the sensor element 10 through the hole of the cover body 42 and the connection hole of the elastic pressing part 50. Since the sensor element 10 measures the change of the air pressure and transfers the measured value to the control unit of the vehicle, the airbag may be deployed.

In accordance with the embodiment of the present invention, since the elastic pressing part 50 pressurizes the sensor element 10 when the cover 40 is coupled to the housing 20, the sensor element 10 can be stably mounted without a separate part such as a PCB, which makes it possible to shorten the manufacturing process. Since one side of the sensor element 10 is supported by the terminal part 25 and the other side of the sensor element 10 is supported by the support protrusion 31, the sensor element 10 can be stably connected to the terminal part 25, which makes it possible to improve the operation reliability of the device. Furthermore, since the sealing protrusion 28 formed in the housing 20 provides a sealing structure while pressing the internal elastic surface of the elastic pressing part 50, the airtightness can be improved. Since the hook member 44 is hooked to the inside of the first guide groove 37 serving as a straight passage in order to temporarily assemble the cover 40, the operation of coupling the cover 40 mounted on the housing 20 can be easily performed.

In accordance with the embodiment of the present invention, since the elastic pressing part pressurizes the sensor element while the cover is coupled to the housing, the sensor element can be stably mounted without a separate part such as a PCB, which makes it possible to shorten the manufacturing process.

Furthermore, since one side of the sensor element is supported by the terminal part and the other side of the sensor element is supported by the support protrusion, the sensor element can be stably connected to the terminal part, which makes possible to improve the operation reliability of the apparatus.

Furthermore, since the sealing protrusion formed in the housing provides a sealing structure while pressing the internal elastic surface of the elastic pressing part, the airtightness can be improved.

Furthermore, since the hook member is hooked to the inside of the first guide groove serving as a straight passage in order to temporarily assemble the cover, the operation of coupling the cover mounted on the housing can be easily performed.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A pressure sensing apparatus for an airbag, comprising:
   a sensor element configured to measure a change of air pressure resulting from a vehicle collision;
   a housing having the sensor element seated therein, and comprising a terminal part electrically connected to the sensor element, wherein the housing is fixed to a vehicle body;
   a cover detachably installed on the housing; and
   an elastic pressing part having one side connected to the cover and the other side protruded toward the sensor element to press the sensor element,
   wherein:
   the elastic pressing part comprises an elastically deformable material;
   the housing comprises a support protrusion, the support protrusion and the terminal part being configured to support a bottom of the sensor element;
   the housing comprises:
      a housing body having a mounting groove in which the sensor element is seated; and
      a connector extending from the housing body and comprising a connector terminal formed therein, the connector terminal being connected to the terminal part;
   the support protrusion protrudes from a base surface of the housing body toward the sensor element and supports one side of the sensor element, and the terminal part supports the other side of the sensor element;
   the housing body further comprises a guide groove and a hook member, the hook member being formed on the cover, and inserted and hooked to the guide groove; and
   the guide groove comprises:
      a first guide groove configured to guide the hook member to move straight, the hook member being inserted into the housing body; and
      a second guide groove comprising an inclined guide surface, the hook member configured to move along the inclined guide surface and toward the elastic pressing part, and then be hooked to an inside of the housing.

2. The pressure sensing apparatus for an airbag of claim 1, wherein the support protrusion is configured to be brought in surface contact with the bottom of the sensor element.

3. The pressure sensing apparatus for an airbag of claim 1, wherein the housing further comprises a sealing protrusion which protrudes from the housing body positioned at an edge of an entrance of the mounting groove and presses the elastic pressing part.

4. The pressure sensing apparatus for an airbag of claim 1, wherein the housing body further comprises a guide rib which protrudes to an inside of the mounting groove and guides the sensor element to be in contact with the terminal part.

5. The pressure sensing apparatus for an airbag of claim 1, wherein the cover comprises:
   a cover body connected to the elastic pressing part;
   a hook member extended from the cover body, and inserted and coupled to the housing; and
   a protruding pipe protruding to an outside of the cover body, and forming a passage through which air is moved, wherein air pressure transferred through the protruding pipe is transferred to the sensor element through a hole in the cover body and a hole in the elastic pressing part.

6. The pressure sensing apparatus for an airbag of claim 5, wherein the hook member comprises:
 a hook body extended from the cover body into the housing; and
 a hook protrusion protruding laterally from an end of the hook body, and hooked to the inside of the housing,
 wherein a contact surface of the housing faces the hook protrusion, and an engagement surface of the hook protrusion contacts with the contact surface, wherein the contact surface of the housing and the engagement surface of the hook protrusion are inclined.

7. The pressure sensing apparatus for an airbag of claim 5, wherein the elastic pressing part comprises:
 a plate-shaped internal elastic part pressed against a sealing protrusion formed on the housing; and
 an elastic pressing body protruding from the internal elastic part to press the sensor element, and forming an inner space connected to the protruding pipe.

8. The pressure sensing apparatus for an airbag of claim 7, wherein the elastic pressing part further comprises an anti-movement protrusion protruding to the inside of the housing from the elastic pressing body.

9. The pressure sensing apparatus for an airbag of claim 7, wherein the elastic pressing body comprises:
 a first body protruding toward the sensor element from the internal elastic part; and
 a second body having a height difference from the first body in a direction extending from the cover body away from the sensor element, and protruding toward the sensor element to press the sensor element,
 wherein a pressing surface of the second body facing the sensor element has an area equal to or smaller than the area of the sensor element.

* * * * *